(No Model.) 6 Sheets—Sheet 2.

C. B. ADAMS.
RECORDING ANEMOSCOPE.

No. 420,219. Patented Jan. 28, 1890.

WITNESSES:
Donn Twitchell
C. Sedgwick

INVENTOR
C. B. Adams
BY
Munn & Co.
ATTORNEY (No Model.) 6 Sheets—Sheet 5.
C. B. ADAMS.
RECORDING ANEMOSCOPE.
No. 420,219. Patented Jan. 28, 1890.
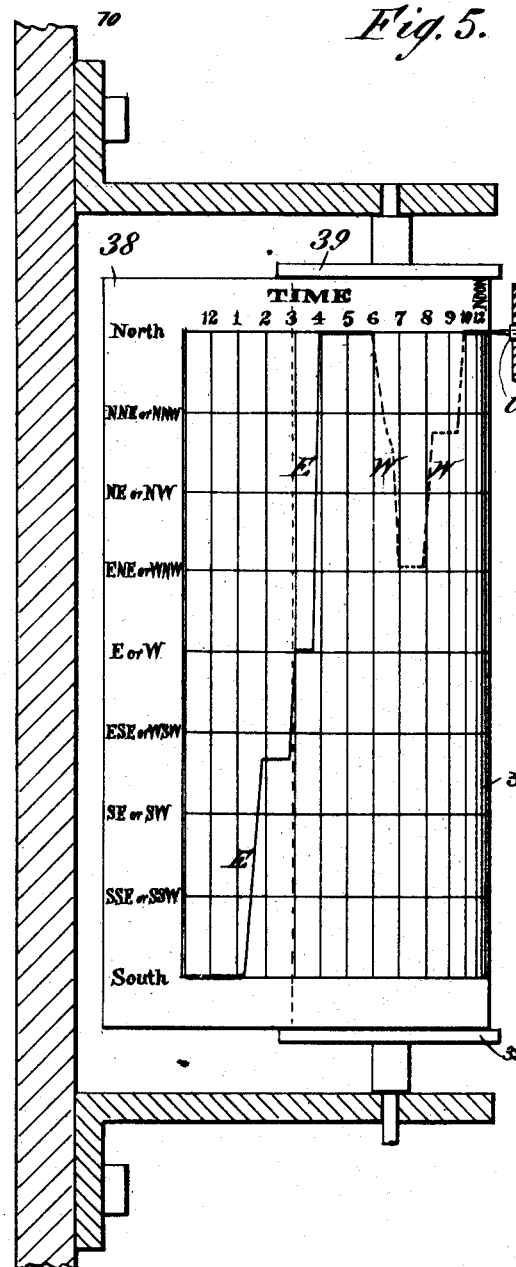
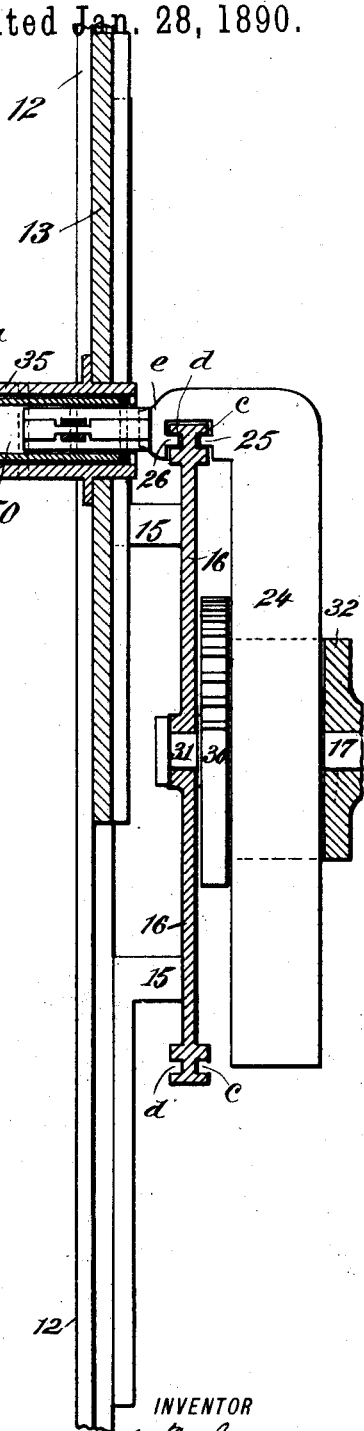
Fig. 5.
WITNESSES:
Donn Fintchell
C. Sedgwick
INVENTOR
C. B. Adams
BY Munn & Co
ATTORNEY (No Model.)  6 Sheets—Sheet 6.

C. B. ADAMS.
RECORDING ANEMOSCOPE.

No. 420,219.  Patented Jan. 28, 1890.

WITNESSES:  INVENTOR
Dom Twitchell  C. B. Adams
C. Sedgwick  BY Munn & Co.
  ATTORNEY

UNITED STATES PATENT OFFICE.

CORNELE BERRIEN ADAMS, OF WALTHOURVILLE, GEORGIA.

RECORDING-ANEMOSCOPE.

SPECIFICATION forming part of Letters Patent No. 420,219, dated January 28, 1890.

Application filed March 23, 1889. Serial No. 304,445. (No model.)

*To all whom it may concern:*

Be it known that I, CORNELE BERRIEN ADAMS, of Walthourville, in the county of Liberty and State of Georgia, have invented a new and Improved Recording-Anemoscope, of which the following is a full, clear, and exact description.

This invention relates to the class of instruments that are employed for the purpose of recording all changes in the direction of the wind, the main object of the invention being to secure an accurate graphic record of the direction of the wind at any hour or minute of the day.

To the end named the invention consists, essentially, of a properly-ruled web, a web-advancing mechanism, pointers or markers arranged in connection with the web, a vane, and connections between the vane and the markers, whereby as the vane shifts the position of the markers will be changed and a record secured upon the advancing web, all as will be hereinafter more fully explained, and specifically pointed out in the claims.

Reference is to be had to the accompanying drawings, forming a part of this specification, in which similar figures and letters of reference indicate corresponding parts in all the views.

Figure 1:
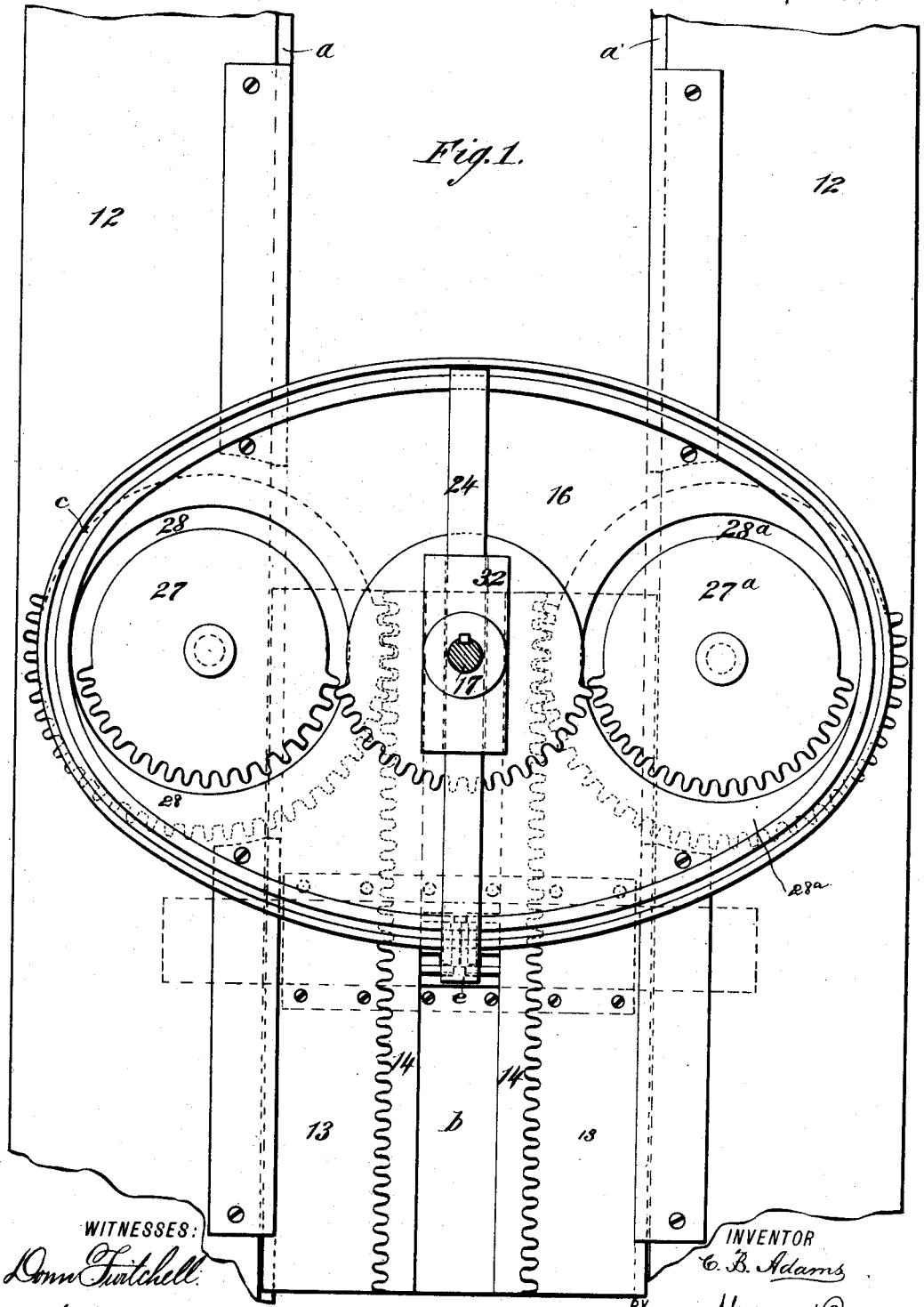
Figure 2:
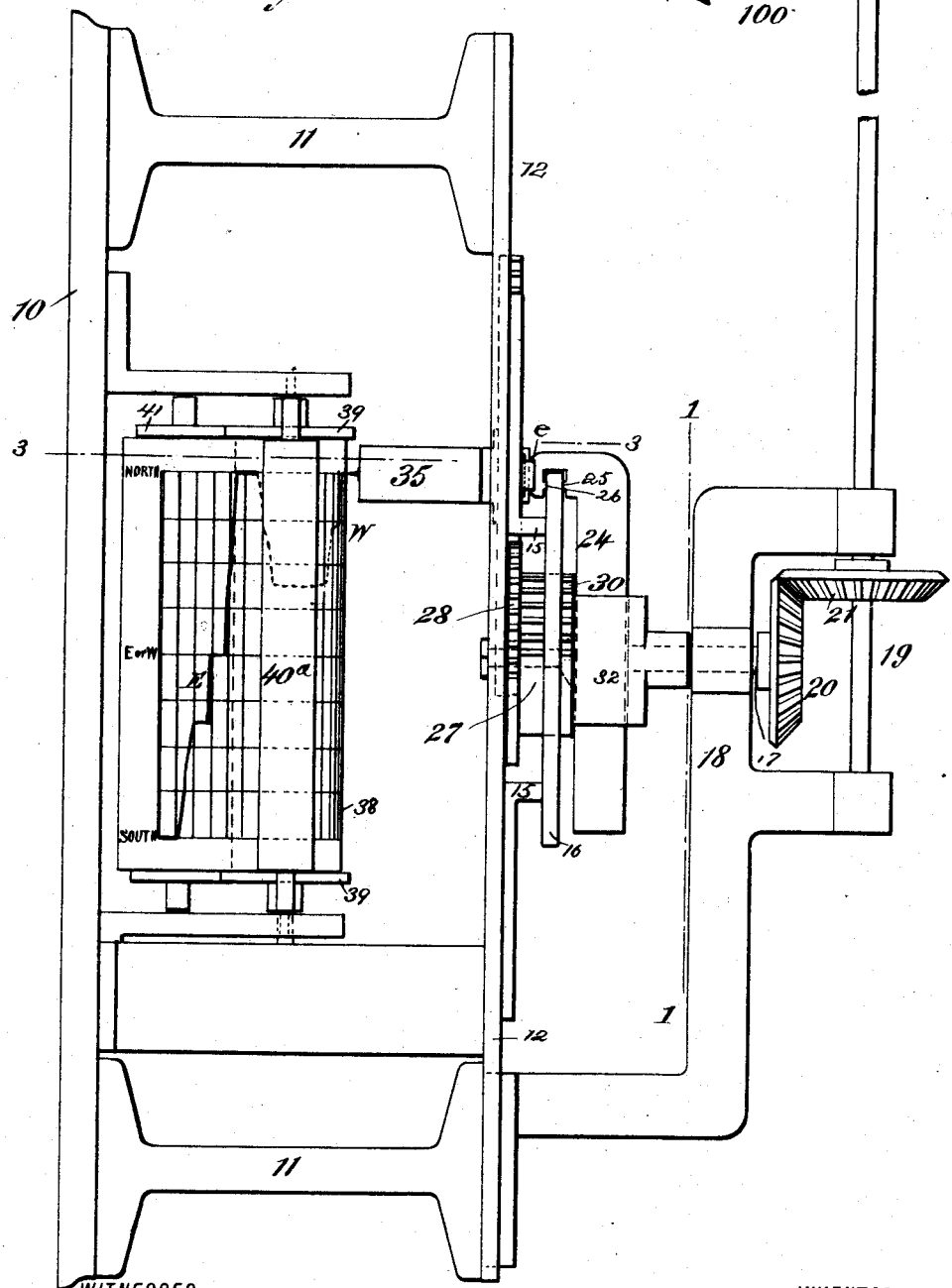
Figure 3:
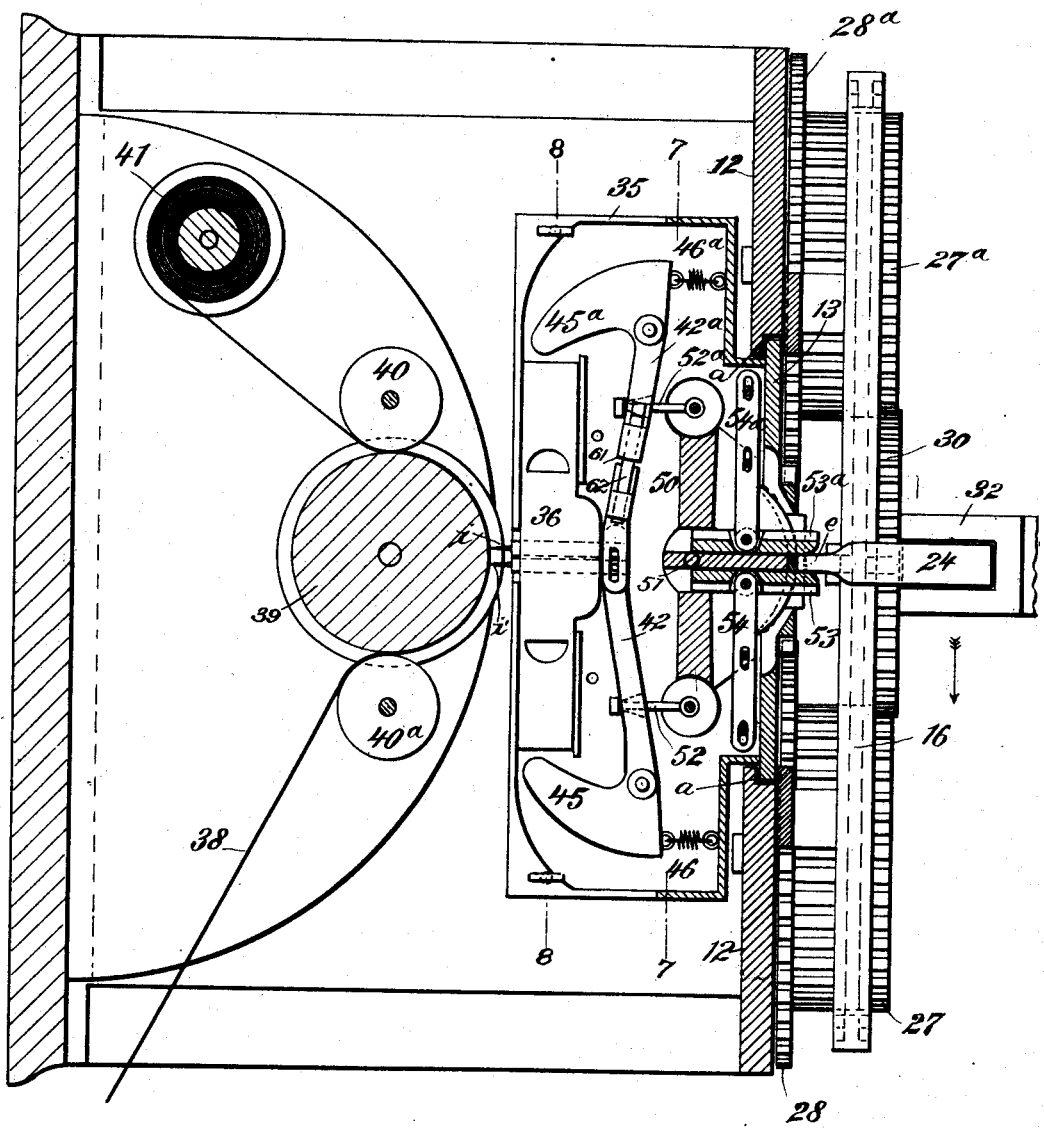
Figure 4:
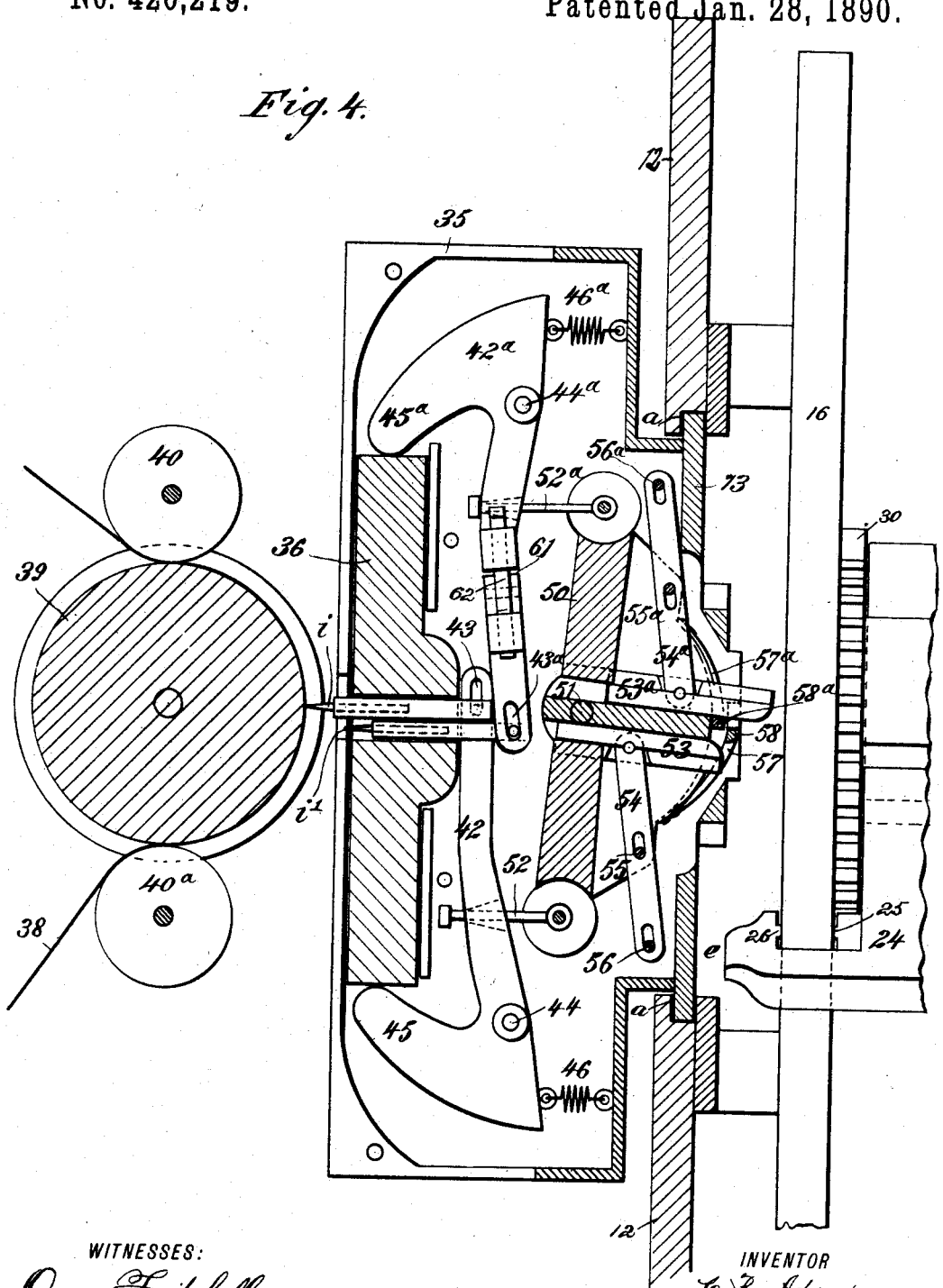
Figure 6:
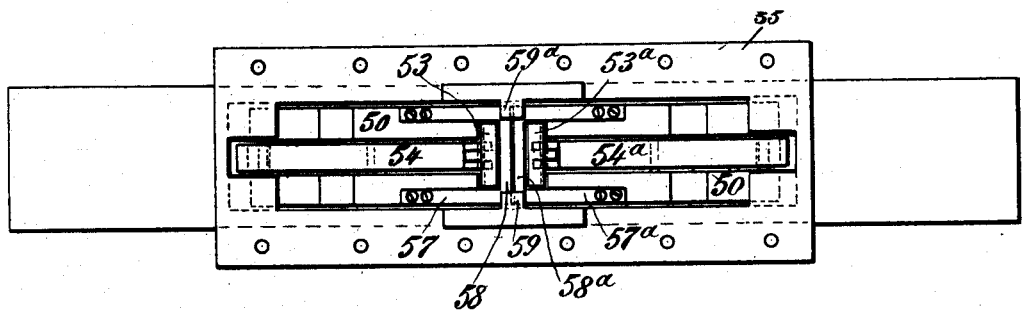
Figure 7:
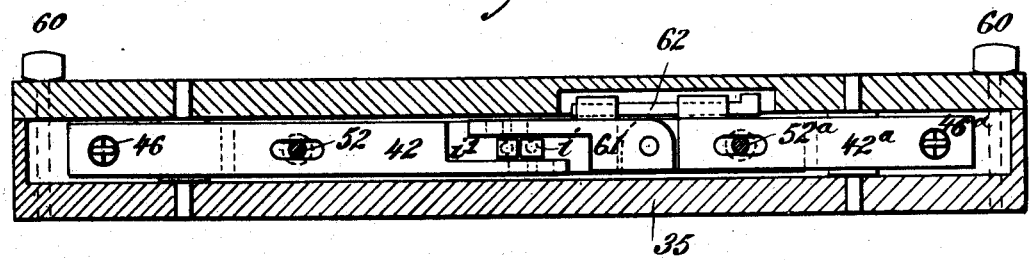
Figure 8:
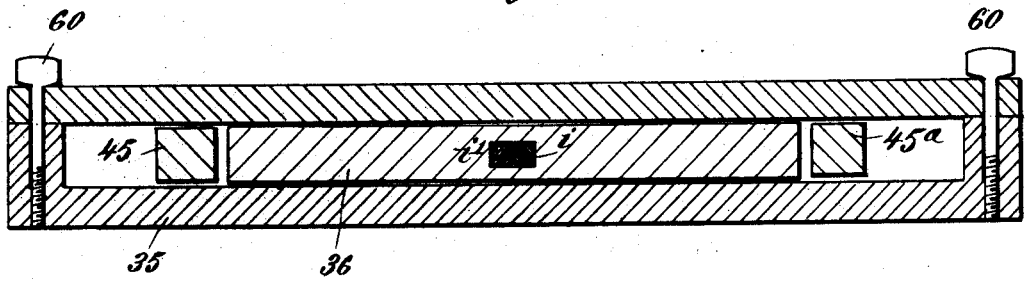

Figure 1 is a face view of a portion of my recording-anemoscope, the view being taken on line 1 1 of Fig. 2, the parts being represented as they appear when the vane is pointing to the south. Fig. 2 is a side view of the machine upon a reduced scale, the view representing the parts as they appear when the vane is pointing to the north, the parts being supposed to have traveled from the position in which they are shown in Fig. 1 to the position in which they are shown in Fig. 2 by way of the east. Fig. 3 is a sectional plan view, the view being taken about on the line 3 3 of Fig. 2, the parts being represented as they appear when the vane is pointing to the north. Fig. 4 is an enlarged detail view, the parts, however, being represented as they appear after the vane has shifted from the north to north-northwest. Fig. 5 is a central sectional view of the parts, which said parts are represented as they appear in Fig. 3. Fig. 6 is a view of the outer side of the marker-carrying box. Fig. 7 is a sectional view on line 7 7 of Fig. 3, and Fig. 8 is a sectional view on line 8 8 of Fig. 3.

In the specific construction illustrated in the drawings I have represented my anemoscope as it would appear when its main driving-shaft is in a horizontal plane, such shaft being connected by a proper bevel-gearing with the vane-shaft; but I desire it to be understood that the vane-shaft might be connected directly to the driving-shaft of the marking mechanism.

In the drawings, 10 represents a base-plate, which carries outwardly-extending supports 11, to which there are secured plates 12, the edges of said plates being cut away, as shown at *a*, to receive a plate 13, having a central slot *b* and carrying racks 14, as clearly shown in Fig. 1. The plates 12 carry outwardly-extending studs 15, (see Fig. 5,) upon which studs I secure an elliptical plate 16, which said plate serves as the support for a mutilated gear 30, said gear being connected to the plate, as shown in said Fig. 5, by a stud 31.

To the outer face of the gear 30, I secure a box 32, which serves as the bearing for one end of the main horizontal driving-shaft 17, the other end of said shaft being supported in a bracket 18, which also serves as the support for the vane-shaft 19, the shafts 17 and 19 being connected by means of bevel-gears 20 and 21, that are arranged as clearly shown in Fig. 2.

The box 32, carried by the gear 30, is apertured to receive an arm 24, and this arm is provided with projections 25 and 26, that enter grooves *c* and *d*, which extend about the edge of the plate 16, the edge *e* of the arm 24 extending inward toward the plate 13, for a purpose to be hereinafter set forth.

To the plates 12, I stud mutilated gears 27 and 27ª, which said gears extend through apertures formed in the plate 16, to be engaged by the mutilated gear 30, and to the gears 27 and 27ª are secured other gears 28 and 28ª, that engage the racks 14, carried by the plate 13, the arrangement being such that if the vane 100 moves from the south to the north by way of east the parts will be shifted from the position in which they are shown in Fig. 1 to the position in which they are shown in Fig. 2, the plate 13 being carried upward, and the edge e of the arm 24 extending inward from the top of the plate 16 instead of inward from the bottom of such plate.

The plate 13 carries a box 35, in which there is mounted a block 36. This block 36 carries two markers i i', which bear against a web 38, that passes about a drum 39, being guided by the rolls 40 and 40ª, and being drawn from a reel 41 by any proper clock-work, such clock-work not being indicated in the drawings.

The markers or pencils i i' are connected by means of pins with the long arms of levers 42 and 42ª, the pins riding in slots 43 and 43ª, formed in the levers. The levers 42 and 42ª are pivotally mounted upon studs 44 and 44ª, and these levers are provided with toes 45 and 45ª, which closely approach and at times bear against the ends of the block 36, the long arms of the levers being normally held against the face of the block 36 by springs 46 and 46ª.

For a purpose to be hereinafter explained it becomes at times necessary to withdraw one or the other of the markers from the marking position, and to bring about this result I pivotally mount a frame 50 upon a stud 51, the ends of said frame carrying headed bars 52 and 52ª, which pass through apertures formed in the levers 42 and 42ª, and upon the frame I mount slides 53 and 53ª, to which there are pivotally connected links 54 and 54ª, such links being slotted to receive pins 55 and 55ª, that are carried by the frame, and being also slotted to receive pins 56 and 56ª, that are connected to the box 35.

Upon the frame 50, I mount double-armed springs 57 and 57ª, the arms of said springs being connected by cross-bars 58 and 58ª, (see Fig. 6,) the tendency of the springs being to spring up from the outer face of the frame, this tendency, however, being prevented when the parts are in the position in which they are shown in Figs. 3 and 6 by stops 59 and 59ª, which stops are rigidly connected to the box 35, as clearly shown in Fig. 6.

The web 38 is ruled horizontally and vertically, the vertical lines indicating time and the horizontal lines the direction of the wind. In the drawings I have shown a web having nine horizontal lines, the upper line being the north line, the next the north-northeast or north-northwest, the next northeast or northwest, the next east-northeast or west-northwest, the middle line the east or west line, and the other lines being as shown in Fig. 5; but it will of course be understood that other horizontal lines could be inserted, and thus a more minute record could be secured.

In Figs. 2 and 5 I have shown a chart upon which there is a record of the direction of the wind from twelve midnight to twelve noon, the wind at midnight having been from the south, changing from south to north by way of east, the wind being due north at four a. m., and so continuing until six a. m., when it shifted toward the west, the vane going almost to west-northwest, but shifting back again to north.

Now, in order to distinguish between the east and west, it is necessary that I employ two markers of contrasting color, the contrast being indicated by the lines east and west in Fig. 5. When the vane points due north, both markers bear against the web; but we will suppose that the vane shifts from north to west. As before stated, when the vane is in the north the parts are as represented in Fig. 3; but as the vane shifts from north to west the gear 30 is moved in the direction of the arrow shown in Fig. 3, and as the gear is so moved the finger or projection e of the arm 24 will bear against the end of the slide 53, and will rock the frame 50 until the double-armed spring 57 is free to move to the position shown in Fig. 4, in which position the cross-bar of the spring is represented as bearing upon the stops 59 and 59ª, the tilting of the frame carrying the slide 53ª outward and the slide 53 inward, and at the same time drawing on the lever 42ª, so that its long arm will be drawn inward, thus carrying its marker i' from the web 38, the toe 45ª of the lever being brought to bear upon the block 36 and forcing such block to a position such that the marker i will extend outward from the center of the box.

If the wind should shift so that the vane would be moved to carry the gear 30, and with it the arm 24, back past the north point, the finger or projection e would strike against the cross-bar 58 of the double-armed spring 57, and as the outer face of such cross-bar is inclined the cross-bar would be forced inward away from the stops 59 and 59ª. Then as the arm 24 continued to advance the slide 53ª would be borne upon and the frame 50 returned to its normal position, as shown in Fig. 3, this return being brought about just at the time when the vane reached the due north point, and as the frame 50 was moved as last above set forth the spring 46ª would be left free to act to throw the marker i' out against the web 38.

Should the vane move from north to east, the operation would be the same, except that the frame 50 would be tilted in an opposite direction, and the marker i' would be advanced and the marker i be retracted. The same operation would take place at the south point.

In order that the markers may be readily reached for repair, I provide the box 35 with a cover that is held to place by headed screws 60, and I form the long arm of the lever 42ª with a joint 61, the two sections of the lever-arm, however, being normally held rigid by a bolt 62, (see Figs. 3, 4, and 7,) the arrangement being such that by removing the cover and turning up the extending section of the lever 42ª both markers may be readily reached, the marker i resting on top of its lever-arm, as shown in Fig. 7, while the marker i' is arranged below its supporting-lever.

Having thus described my invention, I claim as new and desire to secure by Letters Patent—

1. In a recording-anemoscope, the combination of markers, an oscillating frame, and a connection between the frame and markers, whereby the markers will be alternately projected and withdrawn as the frame is oscillated, substantially as described.

2. In a recording-anemoscope, the combination of an oscillating frame, pivoted levers, connections between the levers and oscillating frame, and a marker carried by each lever, substantially as herein shown and described.

3. In a recording-anemoscope, the combination, with a block, of pivoted and spring-pressed levers provided with toes for engaging the block, markers pivotally connected to the levers, a pivoted frame, a connection between the frame and levers, and means for operating the frame, substantially as herein shown and described.

4. In a recording-anemoscope, the combination, with a vane and a shaft operated therefrom and provided with an arm, of a pivoted frame, slides mounted upon the frame and adapted to be operated upon by the arm of the shaft, pivoted levers connected to the frame, and markers pivotally connected to the said levers, substantially as herein shown and described.

5. In a recording-anemoscope, the combination, with a vane, of a web, a mutilated gear controlled by the vane, other mutilated gears, with which the first mutilated gear engages, a plate provided with racks that are engaged by the last-named gears, and a marker carried by the plate, substantially as described.

6. In a recording-anemoscope, the combination, with a vane, of a gear 30, gears 27 and 27$^a$ and 28 and 28$^a$, a plate 13, provided with racks that are engaged by the gears 28 and 28$^a$, a marker connected to the plate, and a web against which the marker bears, substantially as described.

7. In a recording-anemoscope, the combination, with a vane, of a gear 30, gears 27 and 27$^a$ and 28 and 28$^a$, a plate 13, provided with racks that are engaged by the gears 28 and 28$^a$, a plate formed with a groove near its peripheral edge, an arm provided with a finger that engages said plate-groove, a box, markers mounted within the box, levers to which the markers are connected, a frame connected to the levers, slides carried by the frame and arranged for engagement with the arm-finger, and a web, all parts being arranged substantially as described.

8. In a recording-anemoscope, the combination, with a vane, of a gear 30, a plate 16, an arm mounted to slide upon the gear 30 and to engage a groove formed near the peripheral edge of the plate 16, a finger extending inward from the arm, gears 27 and 27$^a$ and 28 and 28$^a$, a plate 13, provided with racks that are engaged by the gears 28 and 28$^a$, a box carried by the plate 13, markers arranged within the box, levers to which the markers are connected, a frame, connections between the levers and the frame, slides carried by the frame, links connected to the slides, spring-retaining devices carried by the frame, and a web, all parts being arranged substantially as described, and for the purpose stated.

9. In a recording-anemoscope, the combination, with a vane, of a gear 30, connections between the gear and the vane-shaft, an arm mounted to slide upon the gear, a plate formed with a groove that is engaged by said arm, a finger extending inward from the arm, gears 27 and 27$^a$ and 28 and 28$^a$, a plate 13, provided with racks 14, that are engaged by the gears 28 and 28$^a$, a box 35, carried by the plate, a block 36, mounted within the box, markers $i$ and $i'$, arranged within a slot formed in the block and extending through a slot formed in the box, a web against which the markers bear, levers to which the markers are connected, springs arranged in connection with the levers, a frame, connections between the frame and the levers, slides carried by the frame, links connected to the slides, the frame, and the box, springs carried by the frame, and stops carried by the plate 13, against which the springs at times abut, all parts being arranged substantially as and for the purpose stated.

CORNELE BERRIEN ADAMS.

Witnesses:
J. C. HINES,
J. SLOEMAN ASHMORE.